United States Patent [19]
Parker
[11] 4,401,312
[45] Aug. 30, 1983

[54] AUTOMATED TRASH COLLECTION RECEPTACLE

[76] Inventor: Bruce H. Parker, 25543 Avenida Frasca, Valencia, Calif. 91355

[21] Appl. No.: 378,986

[22] Filed: May 17, 1982

Related U.S. Application Data

[63] Continuation-in-part of Ser. No. 246,596, Mar. 23, 1981, abandoned.

[51] Int. Cl.[3] ........................... B62B 1/00; B62B 7/02
[52] U.S. Cl. ............................. 280/47.17; 280/47.26; 220/1 T; 220/337; 220/342
[58] Field of Search ............... 220/1 T, 337, 340, 342; 280/47.17, 47.26; 248/129

[56] References Cited

U.S. PATENT DOCUMENTS 2,744,710 5/1956 Gerosa ............................... 248/129
2,881,007 4/1959 Karwatt et al. .................. 280/47.17
4,216,862 8/1980 Daenen .............................. 220/337

*Primary Examiner*—George T. Hall
*Attorney, Agent, or Firm*—Wagner & Bachand

[57] ABSTRACT

Machine dumpable, self-closing trash receptacle comprising an axially elongated, upwardly open, trash receiving body having an outwardly projecting flange at its upper rim, and a body cover, the body and cover being connected in hinged relation by cooperating body and cover portions defining a series of tabs and a mating series of slots, and fastening means connecting the tabs and slots for maintaining mating interfittment of the tabs and slots in normal covered, and inverted dumping condition of the receptacle.

25 Claims, 12 Drawing Figures

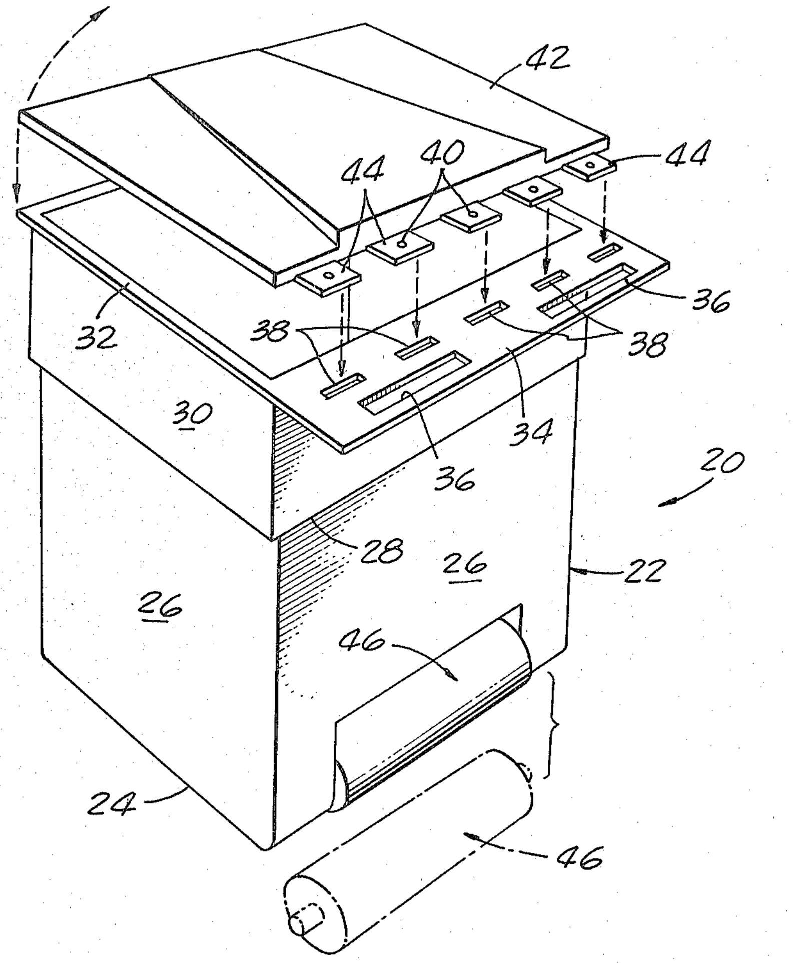
FIG. 2.
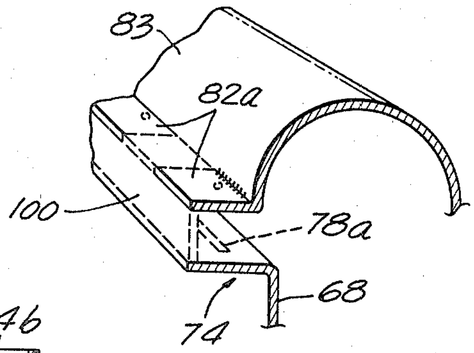
FIG. 11.
FIG. 3.
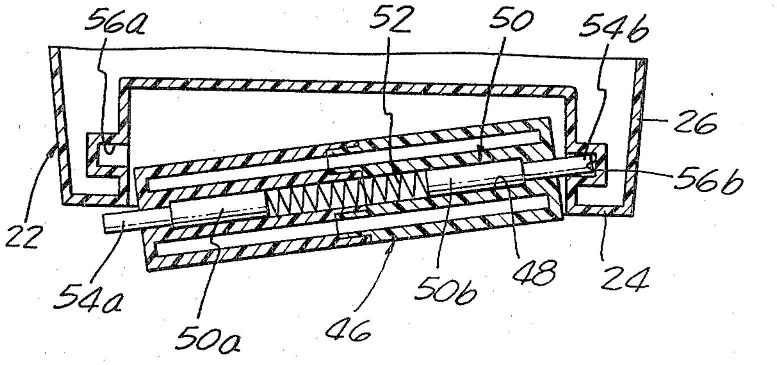

FIG. 4.
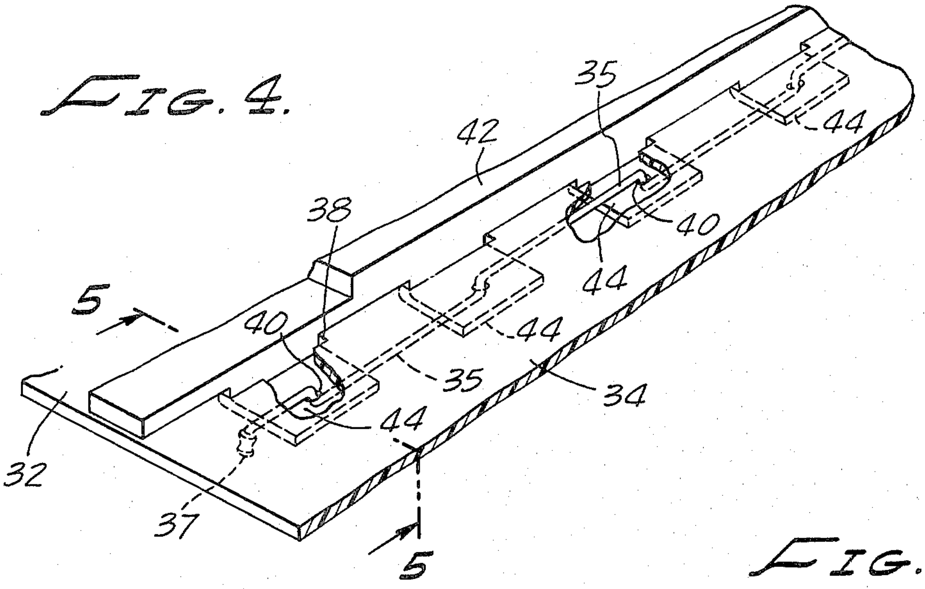
FIG. 10.
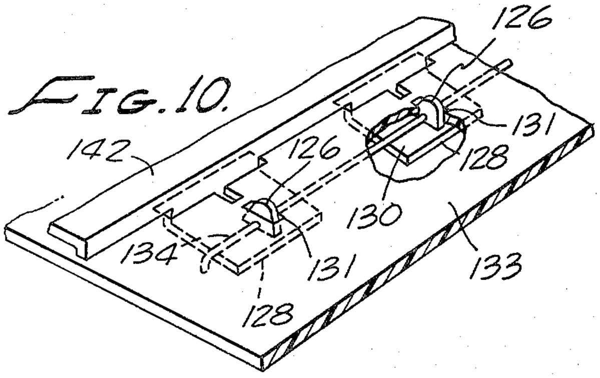
FIG. 9.
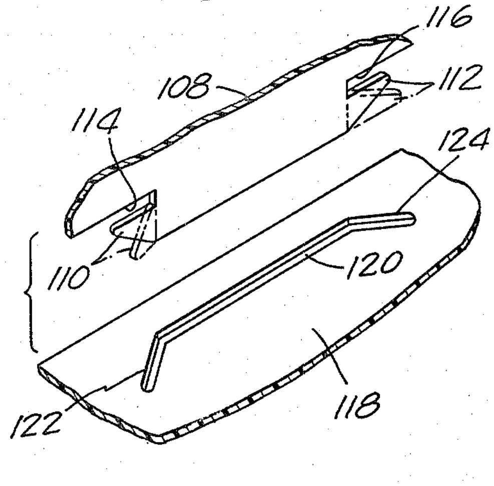
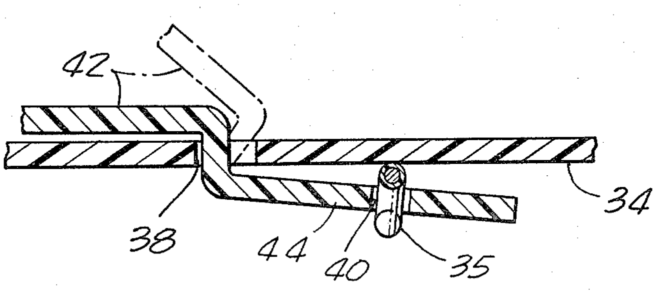
FIG. 5.

AUTOMATED TRASH COLLECTION RECEPTACLE

REFERENCE TO RELATED APPLICATION

This application is a continuation in part of my copending application of the same title, Ser. No. 06/246,596 filed Mar. 23, 1981, now abandoned, the contents and disclosure of which are hereby incorporated by reference herein.

TECHNICAL FIELD

This invention has to do with trash receptacles and more particularly is concerned with trash receptacles for automated garbage collection systems.

BACKGROUND ART

Certain cites of the United States have embarked upon improvements in their trash collection programs in an effort to reduce labor costs and decrease unsightliness on city streets. Integral to these programs is the use of garbage trucks which have articulated means for picking up and dumping trash containers without the containers being handled by the driver or the driver's helper on the truck. Typical of such trucks are those having a pair of arms which circumscribe at least partially the trash container, lifting it by a shoulder defined on the container and inverting it over the dump bed of the truck. For purposes of economy, and because the physical limitations of human operators is not a factor, trash receptacles for such automated collection are relatively large e.g. 90 to 150 gallon trash containers are in use and larger sizes, e.g. to 300 gallon, are being contemplated.

The adaptation of city collection systems to these new trucks and trash receptacles has brought new problems. Because of the great size of these trash containers, the householder or industrial user has difficulty in positioning the containers at the curb or in driveways for collection. Many presently available trash receptacles for automated collection, if not provided with a wheel and axle arrangement, are only difficultly dragged across areas from the point of refuse deposit to the point of refuse collection, often scoring lawns and scratching sidewalks as the householder struggles with these very large receptacles.

Additionally, the improvement in economics promised by automated trash collection systems has not been realized because the assembling of the receptacles from parts furnished by vendors is usually done by city workers, and the cost has proved to adversely affect anticipated economics. This is due primarily to the multiplicity of parts which must be put together, tested for operability, under supervision, before being placed with the householder or industrial user. Further, the numerous assembly parts typical of wheel and axle mounted receptacles are costly and subject to malfunction.

Another limitation in prior art receptacles is the difficulty of retaining and opening covers. The covers are easily dislodged and lost, or are so heavy that the normal user cannot lift the top to put trash into the receptacle.

The present invention enable use of lightweight covers eaily handled by the consumer, but which is nonetheless permanently hinged to the receptacle body against theft and loss.

DESCRIPTION OF THE INVENTION

It is therefore an object of the present invention to provide an improved trash receptacle especially adapted for automated trash collection systems. It is another object to provide such a trash receptacle which despite great size is easily maneuvered by the householder. It is a further object of the invention to provide such a trash receptacle which is easily assembled by relatively unskilled municipal workers, which has few parts subject to malfunction, and which overall is quicker from delivery by the vendor to installation on the street in the city, while retaining all the advantages of previously known automated system trash receptacles. Other features include readily installed, easy rolling support means, hatch openings to obviate heavy cover lifting, and easy to install, durable, and attractive cover and receptacle body connection. It is a highly specific of the invention to provide an improved closure arrangement for automated trash receptacles, in the form of a cover which is reliable in use, opens easily, closes tightly, is easy to assemble and service in the field, which is low in cost, and has a permanent interconnection feature between cover and body against loss through inadvertence or vandalism. It is still another object of the invention to produce the receptacle body and cover in a single molding operation and preferably from cross-linked polyethylene for maximum economy of production and maximum longevity in use.

These and other objects of the invention to become apparent hereinafter, are realized in accordance therewith in a machine dumpable, self-closing trash receptacle comprising an axially elongated, upwardly open, trash receiving body having an outwardly projecting flange at its upper rim, a body cover, the body and cover being connected in hinged relation by cooperating body and cover portions defining a series of tab means and a mating series of slot means, and fastening means connecting the tab and slot means for maintaining mating interfitment of the tabs and slots in normal covered, and inverted dumping condition of the receptacle.

Typically, the trash receptacle is generally circular or generally rectangular in cross section; the body thereof is preferably comprised of molded cross-linked polyolefin, with the body and cover being integrally molded with the tab and slot means series defining flanges provided for, and adapted to define the series upon said body and cover being severed from each other.

The trash receptacle may further include opposed bearing surfaces formed at a lower corner of the body, and roller means journaled by the bearing means in corner projecting relation for selective rolling and nonrolling support of the body responsive to angular positioning of the trash receptacle relative to the ground. The roller means for this purpose includes a rigid roller having an axial bore, a shaft interfitting the bore, and the shaft having stub ends adapted to be journaled in the bearing means. The shaft typically comprises first and second tubular portions, and compression spring means are provided normally urging the shaft portions into bearing means engagement to rotatably support the roller.

With particular reference to the closure means for the trash receptacle, the tab series is defined by a portion of the cover or the body flange, the slot series being defined by the respective cooperating body or cover portion. Where the cover defines the tab means, outboard portions of the tabs are offset along their length for parallel positioning of the cover on the body in tab-in-slot received relation, the slots being apertured in fastener means passing relation. Suitably, the fasteners are ties i.e. flexible webs coupling the tab apertures together in slot and tab disengagement blocking relation. Or, the fasteners may be nut and bolt assemblies, snap ears formed on the tabs, normally disposed bosses apertured for rod retention parallel to the handle platform, or other structure capable of effecting retention of the body and cover in assembled relation, by their respective tabs and slots, such as normally horizontally extended tab means defining a transverse bore, slot means defined by opposed arms which bracket the tab means, socket means carried by the arms in registry with the tab means bore, and a fastening means compriing a shaft extending between slot means sockets in tab means bore journaled relation. In the last mentioned embodiment, the fastening means shaft typically comprises first and secondportions adapted for end-seated interfittment in the socket means, a compression spring between the shaft portions biasing the portions into engagement with the sockets for hinged connection of the body and cover.

In a preferred embodiment then, the trash receptacle of the invention is generally circular or rectangular in cross section; is comprised of molded cross-linked polyethylene; the body and cover are integrally rotationally molded with the tab and slot series provided for, and thereafter severed from each other; bearing means are molded, cut or otherwise formed at a lower corner of the body, and roller means are journaled by the bearing means in corner projecting relation for selective rolling and non-rolling support responsive to the angular positioning of the trash receptacle relative to the ground; the roller means includes a rigid roller having an axial bore, and a shaft interfitting the bore, the shaft having stub ends adapted to journaling in the bearing means; the shaft comprises first and second opposed tubular portions, and abutting the shaft portions compressed spring means are provided normally urging the portions into bearing means engagement.

In a highly preferred form of the invention, there is provided a machine-dumpable, self-closing trash receptacle comprising an axially elongated, upwardly open, trash receiving body having an outwardly projecting flange at its upper rim defining a plurality of tabs bored along a common transverse axis, a body cover having a flange defining a series of slots arrange to interfit the tabs with blind sockets in registry with the tab bores, and length-adjustable shaft means including a rod endwise insertable in the sockets in tab bores-journaled relation and shaft length adjustment means blocking removal of the cover from the body after the seating of the shaft in the blind sockets, whereby body and cover interfittment in hinged relation is maintained in both normal covered, and inverted dumping condition of the receptacle. The shaft length adjustment means typically comprises a compression spring responsive only to rod axial force, whereby the shaft means is permanently fixed upon rod seating in the blind sockets.

THE DRAWING

The invention will be further described as to an illustrative embodiment in conjunction with the accompanying drawing in which:

FIG. 2 is a perspective view of a rectangular embodiment of the present receptacle;

FIG. 3 is a fragmentary view of the receptacle shown in FIG. 2, depicting the roller arrangement thereof;

FIG. 4 is a fragmentary view of a receptacle depicting the cover hinge feature thereof;

FIG. 5 is a further view of the hinge feature, taken on line 5—5 in FIG. 4;

FIG. 9 is a fragmentary view of a tab and slot snap fit assembly for the present receptacle;

FIG. 10 is a fragmentary view of a further form of tab and slot locking arrangement; and, FIG. 11 is a fragmentary view of the receptacle blank showing the opposed flanges for cutting the slots and tabs.

FIG. 12 is a plan view of another hatch cover embodiment of the invention, partly broken away to show underlying parts, and partly schematic, and in which hinging of the cover at the body is by means of length adjustable shaft means which are irremovable once seated, and on which the body and cover relatively pivot.

PREFERRED MODES

Figure 1:
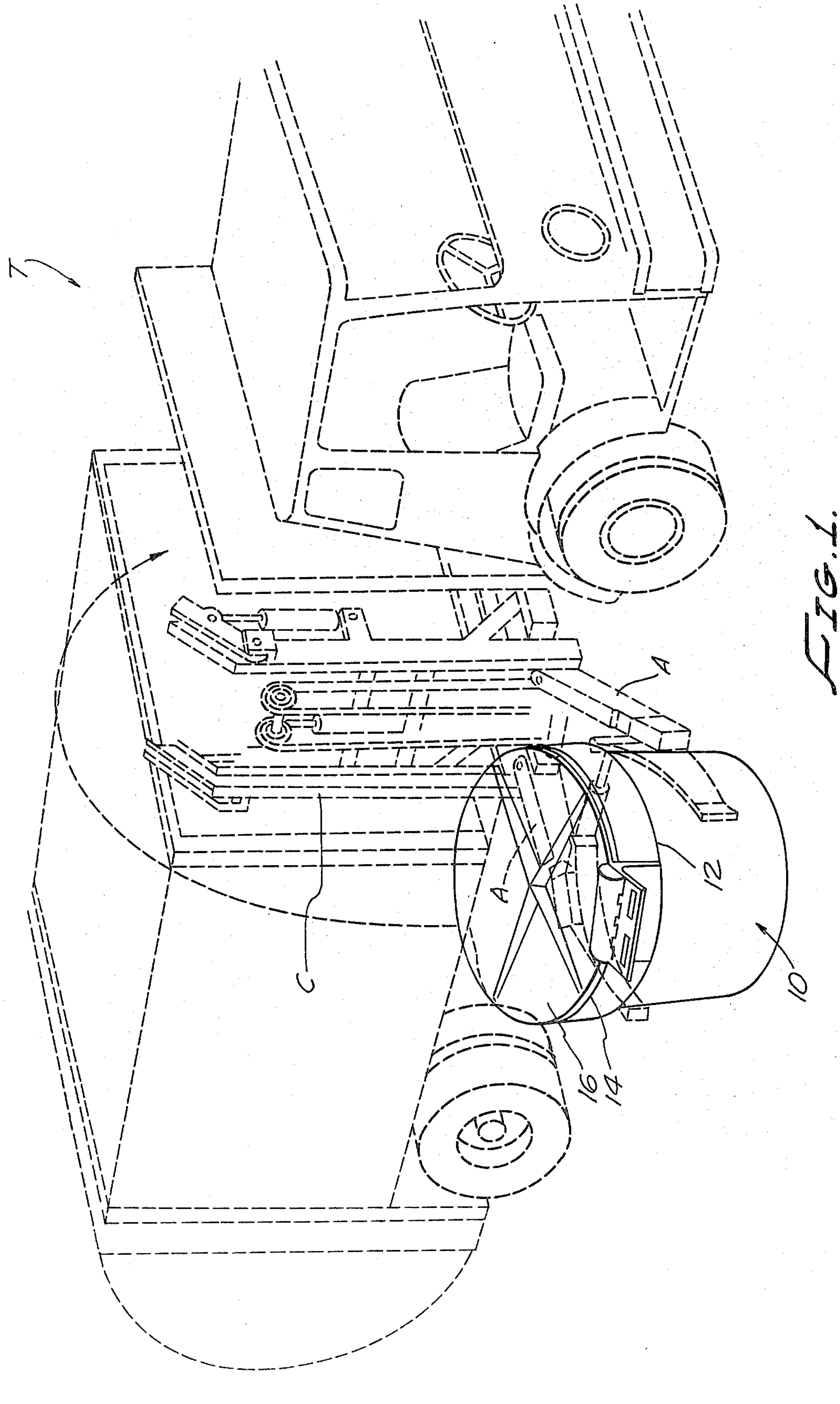
FIG. 1 is perspective view of a trash receptacle according to the invention, with the trash truck handling the same shown in phantom.

With reference now to the drawings in detail, an automated garbage collection system employs a specially equipped collection truck such as that shown at T in FIG. 1, which is provided with articulated arms A carried for elevation or descent on a carriage C. The arms A enclose partially circumferentially the specially adapted trash receptacle 10 which has a circumferential shoulder 12 formed thereon just below the upper edge 14 of the receptacle for supporting engagement by the arms. Once the receptacle 10 is firmly in the grasp of the arms A, the carriage C raises the receptacle and at the top of the rise, inverts the receptacle, the receptacle cover 16 of course opens and the receptacle contents are dumped. The receptacle 10 is then returned to the ground; all operations being accomplished without human lifting of the receptacle.

Machine-dumpable trash receptacles have special requirements over conventional receptacles, including higher strength to accommodate heavier loads of trash, ease of maneuverability despite high weight, easy opening covers which nonetheless are secure in closing the receptacles and not too difficult for the homeowner to manipulate, and ready assembly in the field. The present trash receptacle, now to be described meets all these requirements.

In FIG. 2, a rectangular embodiment of the trash receptacle is shown at 20 comprising an axially elongated upwardly open, trash receiving body 22 formed of bottom wall 24, vertical, somewhat outwardly tapered sidewalls 26 which are offset at 28 to provide a horizontal, circumferential rib 30, which continues upward and somewhat outward to top flange 32 extending at about a right angle to the vertical rib. The flange 32 is relatively extended at one side of the receptacle 20, to define a handle platform 34 with hand holds 36, and inwardly thereof a series of slots 38 for effecting securement to the receptacle of the receptacle cover 42 by its tabs 44, having apertures 40 therein, as is hereinafter detailed.

At the intersection of receptacle bottom wall 24 and sidewall 26, vertically below the handle platform 34, a roller 46, best seen in FIG. 3, is provided positioned so as to project from the plane of the side wall 26 and the bottom wall 24 when the receptacle body 22 is tipped by drawing on the handle platform 34 in a manner enabling rolling support of the receptacle on the roller 46 in the tipped condition, but ground support of the receptacle on the bottom wall 24, when the receptacle is in its normal, vertically upright disposition. The roller 46 is a cylindrical body, suitably of rigid plastic and formed with a through bore 48 in which a shaft 50 is receivable in journaling relation, the shaft having left and right halves 50*a* and 50*b* which oppositely abut compression spring 52, normally urging the shaft halves apart. Stub ends 54*a* and 54*b* formed on the ends of shaft 50 are journaled in bearings defined by cylindrical recesses 56*a* and 56*b* in the sidewall 26, being retained there by the spring 52 acting within the two piece shaft 50. The simple construction of the just described roller arrangement is to be contrasted with the cumbersome multiple part wheel and axle assemblies of previously known trash receptacles. The simplicity of the present design enables rapid assembly, and thus low municipal costs when placing the trash receptacles in the field. The trash receptacle itself is lower cost, as well, since expensive metal parts are kept to a minimum.

Figure 6:
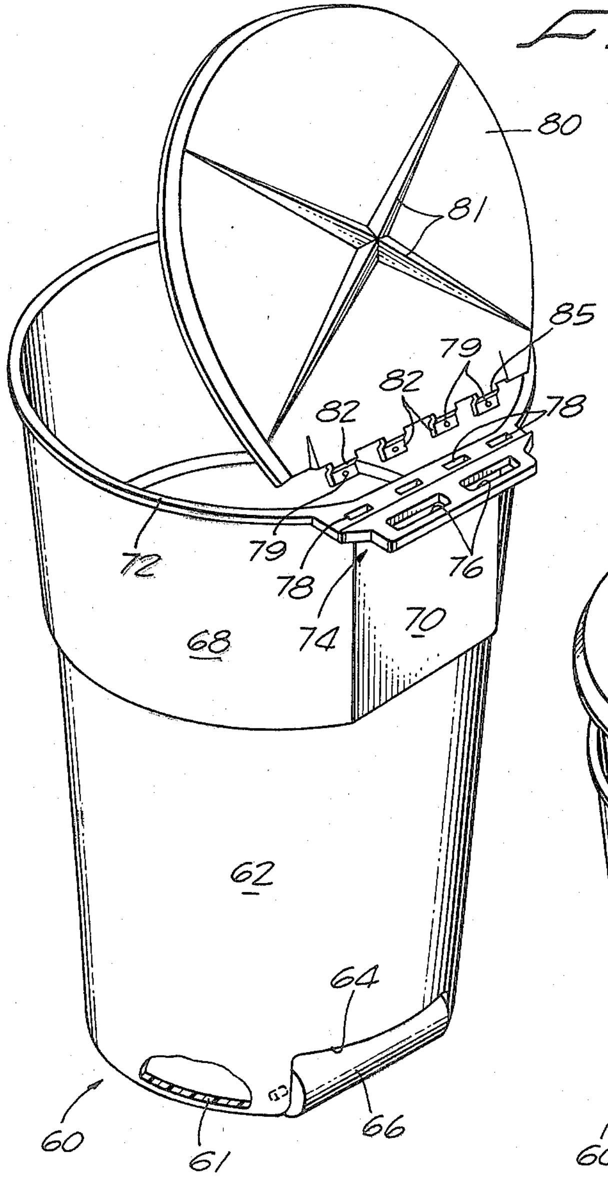
FIG. 6 is a perspective view of a circular cross section embodiment of the present receptacle.
Figure 8:
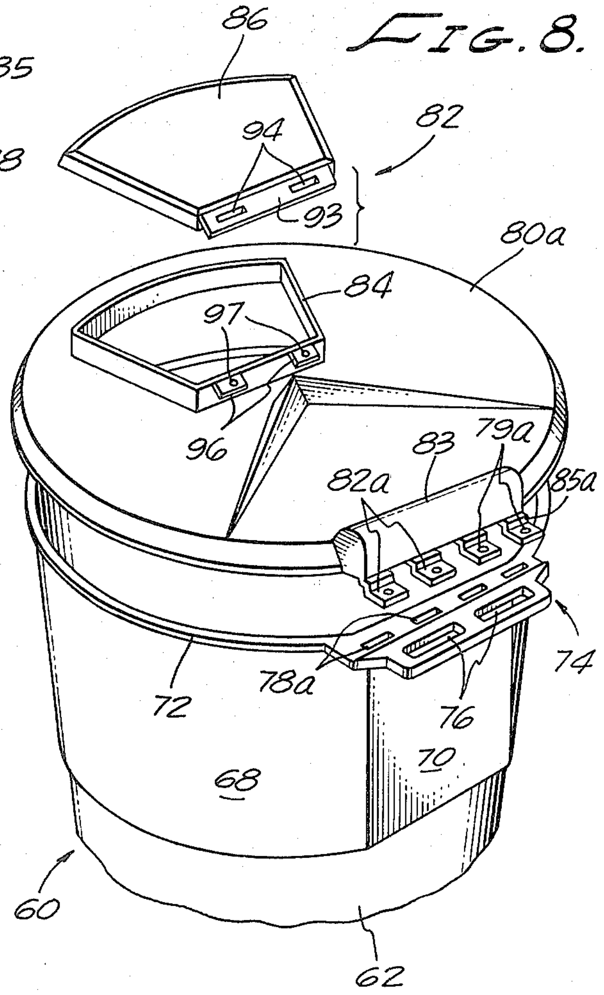
FIG. 8 is a view like FIG. 6 of a hatch cover embodiment of the receptacle according to the invention.
Figure 7:
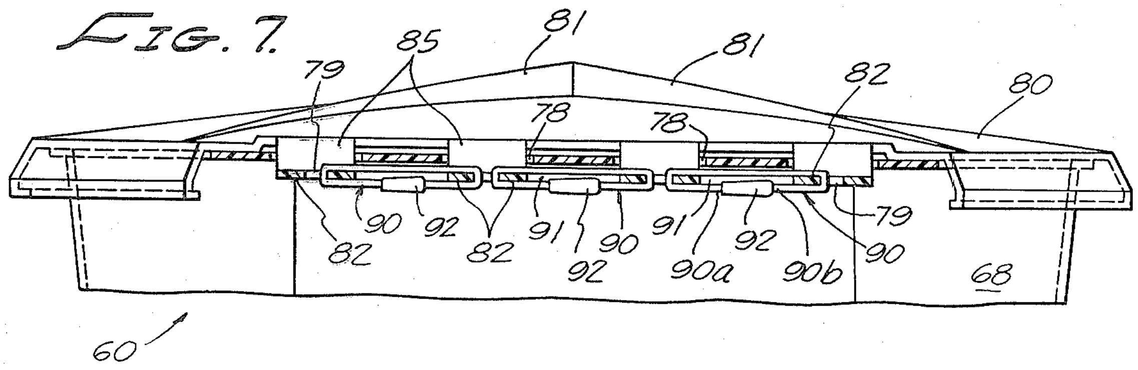
FIG. 7 is a view of the tab and slot assembly of a receptacle like FIG. 6.

With particular reference now to FIGS. 6, 7 and 8 a circular cross-section embodiment of the present invention is shown. Trash receptacle 60 has bottom wall 61 and a sidewall 62 recessed at 64 to receive the roller assembly 66 in the same roll or stand relation described in connection with the embodiment of FIGS. 2 and 3. The receptacle sidewall 62 is similarly deflected at its upper portion to provide a circular rib 68 having a flat 70, and terminating in an outward flange portion 72 surrounding the upwardly open top of receptacle 60. As in the FIG. 2 embodiment, the flange 72 is relatively greatly extended to define a handle platform 74 having hand holds 76 and tab receiving slots 78.

The cover 80 for receptacle 60 is suitably ribbed at 81 in a star pattern as shown for rigidity and strength and is provided with a hinge feature to be hereinafter described, including a lateral series of tabs 82 complementary to the slots 78 formed in the extended receptacle flange 72 inward of handle platform 74, and suitably provided with apertures 79, for purposes to appear.

Initially, however, a highly beneficial feature of a modified form of the present trash receptacle is shown in FIG. 8, in the form of a modified cover 80*a* having a hatch-like access 82, which permits placing of trash in the receptacle 60 without need of lifting the entire cover 80*a*. For this purpose, the cover 80*a* is molded with polygonal lip 84 integrally formed therein, and hatch lid 86 hinged to the lip in a manner to be described, is dimensioned to interfit with the lip in secure relation. The benefits of this arrangement are many fold, particularly when it is recalled that the trash receptacles of the invention are quite a bit larger than the usual household receptacle, and the covers thus much heavier and unwieldy.

As a further feature of this modified form of FIG. 8, the cover 80*a* is provided with as roll hinge 83 for added strength realized from the extra material at the hinge locus. Like but not identical parts of the FIG. 6 embodiment in FIG. 8 are given a like number and an "a", for ease of relating the description.

A signal feature of the present invention in all embodiments is the provision of an improved form of interconnection of the cover and trash receptacle body. With reference particularly to FIG. 7, the provision of tabs 82 on the cover 80, and slots 78 on the rib 74 has been mentioned in connection with FIG. 6. It will be noted by reference to FIGS. 6, 7, and 8 that the tabs 82 (82*a* in FIG. 8) are offset along their length to form stop shoulders 85 (85*a*), best seen in FIG. 7 and to enable the cover 80 (80*a*) and the flange 74 to lie flat against each other with the tabs and slots 78 (78*a*) engaged, effecting a tight closure of the cover and receptacle. The tabs 82 are centrally apertured at 79. For purpose of maintaining the cover 80 and receptacle 60 in aligned position, and allowing hinged movement of the cover relative to the receptacle, a series of flexible ties 90, such as a nylon web, is provided looped through the tab apertures 79 and around the lands 91 defined between adjacent slots 78 to interconnect the cover 80 and receptacle 60. The ends 90*a*, 90*b* of the ties 90 are then brought back together and fastened for each tie with a clip 92.

With reference again to FIG. 8, the hatch lid 86 is provided with flange 93 having slots 94, and the lip 84 with tabs 96 apertured at 97, whereby ties or other fasteners (not shown) are used to secure the two together in hinged relation. The reversal of tab and slot in FIG. 8 hatch cover illustration is to be noted as exemplary of a reversal of parts within the contemplation of the present invention. Assembly of the hatch lid 86 and lip 84 is as described in reference to FIG. 7, except for the location of the tabs and slots.

Referring again to FIG. 2, and companion FIGS. 4 and 5 tabs 44 interfit slots 38 and are held in this connection by a fastener cable 35 serpentined through apertures 40 in sequence. The cable 35 is bulky enough to provide a mechanical interference which blocks removal of the tabs 44 from the slots 38 (see FIG. 5), while permitting pivoting of the cover 42 relative to the body 22. A crimped collar 37 is provided on each end of the cable 35 against endwise withdrawl of the cable from the tab apertures 40.

In FIG. 9 a further fastener system is depicted. There, tab 108 projecting from a cover (not shown) has lateral terminal projections 110, 112 which are slightly flexible, defined by notches 114, 116 in the tab respectively. Handle platform 118 defines a complementary slot 120 for receiving the tab 108. The end portions 122, 124 of the slot 120 are out of the general slot plane, so that the projections 110, 112 snap back under the wall of the handle platform 118 after bending insertion through the slot. This snap lock embodiment of FIG. 9 avoids use of an additional part: the cable fastener.

In FIG. 10 an upstanding boss 126 is provided on the tab 128 upper surface 130 which is insertable through a cooperating slot 131 defined by the handle platform 133. A lateral bore 132 is defined below the handle platform 133 by a series of bosses 126 into which a rod 134 is inserted and secured by deflecting the rod ends. The rod 134 thus in place blocks separation of the cover 142 carrying the tab 128 from the handle platform 133.

In FIG. 12 the body flange 150 defines left and right tabs 152, 154, respectively, each with a through transverse bore 156, 158 in which shaft rod portions 160 are journaled. Each rod portion 160 extends beyond its bore 156, 158 and interfits with blind sockets 162, 164 defined by outboard arms 166, and inboard arm 168 of the cover 169 to form slots 170, 172 and bracket the tabs 152, 154 therein. A compression spring 174, 176 is used within the bores 156, 158, abutting the ends of the rod portions 160 within the bore and urging them outward into the sockets 162, 164 respectively. In assembling the cover 169 to the body flange 150, the shaft rod portions 160 are pressed inward and then permitted to snap out when the sockets 162, 164, are registered with the bores 156, 158. Since the sockets 162, 164 are blind, i.e. closed at their inner end, the shaft portions 160 cannot be dislodged, since they will resapond only to axial pressure, and axial pressure cannot be brought to bear upon them. With this hinge arrangement therefore, ease of pivoting the cover relative to the body is obtained, and the connection is vandal-proof as well.

As shown in FIG. 12, the hatch 180 may be similarly mounted by passing two-piece shaft 182, biased outward by compression spring 184, out from bore 186 into sockets 188, 190, formed in the cover 169. As with the larger cover hinge, this hatch hinge arrangement is also vandal-proof.

The foregoing structure of receptacle body and cover is produced in a highly advantageous manner in accordance with the invention. Being molded of plastic, tops and bottoms of receptacles according to the invention could vary substantially depending on mold conditions, resin variations over the course of a run, cooling cycles and other controllable and uncontrollable factors. To avoid undue variation in interlocking fit of cover and receptacle body, the present receptacles are preferably molded as a single element comprising the cover and the body, which after severing, are perfectly matched by virtue of having undergone formation under identical conditions. To carry out the method a quantity of resin, suitably any moldable resin, but preferably a polyolefin, particularly polethlyene of medium to high density, e.g. 0.935 and higher specific gravity, and optimally a resin with built in or added cross-linkers, is placed in a rotational mold of suitable proportions and molded by melting the resin to conform to the shape of the mold while maintaining the interior of the mold cavity hollow. The mold is cooled and the part removed. To the extent pertinent here, the product of the method is shown in FIG. 11, where the junction of the cover hinge 83 (after FIG. 8) and the circumferential rib 68 and its flange 74 is shown. It will be noted that the cover hinge 83 and the opposed body portions 72, 68 are joined by a thin wall 100 which is indicated in dotted lines to represent the severing of the upper and lower parts at the wall 100. In this manner a perfect fit between cover and body portions is realized, in terms of compensating for molding process variations. Further illustrated in FIG. 11, is the line of cutting, suitably by die, of the tabs 82*a* and slots 78*a* as the molded product is finally shaped to the form shown in FIG. 8.

There is thus provided an improved trash receptacle having the features of low cost, easy assembly, reliable interfittment of parts, effective hinging of cover and body, increased durability, good closure, and ease of movement by the householder which makes the presently disclosed trash receptacle the best choice for automated trash collection systems.

I claim:

1. Machine dumpable, self-closing trash receptacle comprising an axially elongated, upwardly open, trash receiving body having an outwardly projecting flange at its upper rim, a body cover, said body and cover being connected in hinged relation by cooperating body and cover portions defining a series of tab means and a mating series of slot means, and fastening means connecting said tab and slot means for maintaining interfittment thereof in both normal covered, and inverted dumping condition of said receptacle.

2. Trash receptacle according to claim 1, in which said receptacle is generally circular in cross section.

3. Trash receptacle according to claim 1, in which said receptacle is generally rectangular in cross section.

4. Trash receptacle according to claim 1, in which said body is comprised of molded cross linked polyolefin.

5. Trash receptacle according to claim 1, in which said body and cover are integrally molded with the tab and slot means series-defining flanges provided for, and adapted to define said series upon said body and cover being severed from each other.

6. Trash receptacle according to claim 1, including also opposed bearing means formed at a lower corner of said body, and roller means journaled by said bearing means in corner projecting relation for selective rolling and non-rolling support of said body responsive to angular positioning of the trash receptacle relative to the ground.

7. Trash receptacle according to claim 6, in which said roller means includes a rigid roller having an axial bore, a shaft interfitting said bore, and said shaft having stub ends adapted to be journaled in said bearing means.

8. Trash receptacle according to claim 7, in which said shaft comprises first and second tubular portions, and including also compression spring means normally urging said shaft portions into bearing means engagement to rotatably support said roller.

9. Trash receptacle according to claim 1, in which said tab series is defined by a portion of said cover or said body flange, said slot series being defined by the respective cooperating body or cover portion.

10. Trash receptacle according to claim 9, in which said tab means are located on said cover and have outboard portions thereof offset along their length for parallel positioning of said cover on said body in tab-in-slot received relation.

11. Trash receptacle according to claim 10, in which said slot means define apertures in fastener means passing relation.

12. Trash receptacle according to claim 11, in which said fastener means comprises a flexible web coupling said tab apertures in slot and tab disengagement blocking relation.

13. Trash receptacle according to claim 11, in which said fastener comprises a cable coupling said tab means through said apertures in slot and tab means disengagement blocking relation.

14. Trash receptacle according to claim 11, in which said fastener means comprises a snap fit tab and slot assembly coupling tabs and slots in disengagement blocking relation.

15. Trash receptacle according to claim 11, in which said fastener means comprises a boss on said tab means, and a rod adapted to be received by said boss in tab and slot disengagement blocking relation.

16. Trash receptacle according to claim 9, in which said tab means are normally horizontally extended and define a transverse bore, said slot means are defined by opposed arms which bracket said tab means, socket means are carried by said arms in registry with said tab means bore, and said fastening means comprises a shaft extending between said slot means socket in tab means bore journaled relation.

17. Trash receptacle according to claim 16, in which said fastening means shaft comprises first and second portions adapted for end-seated interfittment in said socket means, a compression spring between said shaft portions biasing said portions into engagement with said sockets for hinged connection of said body and said cover.

18. Trash receptacle according to claim 12 or 16, in which said receptacle is generally circular or rectangular in cross section.

19. Trash receptacle according to claim 18, in which said body is comprised of molded cross linked polyethylene.

20. Trash receptacle according to claim 18, in which said body and cover are integrally rotationally molded with the tab and slots series defining flanges provided for and to be thereafter severed from each other.

21. Trash receptacle according to claim 18, including also bearing means formed at a lower corner of said body, and roller means journaled by said bearing means in corner projecting relation for selective rolling and non-rolling support responsive to the angular positioning of the trash receptacle relative to the ground.

22. Trash receptacle according to claim 21, in which said roller means includes a rigid roller having an axial bore, and a shaft interfitting said bore, said shaft having stub ends adapted to journaling in said bearing means.

23. Trash receptacle according to claim 22, in which said shaft comprises first and second tubular portions mutually abutting compressed spring means normally urging said portions into bearing means engagement.

24. Machine dumpable, self-closing trash receptacle comprising an axially elongated, upwardly open, trash receiving body having an outwardly projecting flange at its upper rim defining a plurality of tabs bored along a common transverse axis, a body cover having a flange defining a series of slots arranged to interfit said tabs with blind sockets in registry with said tab bores, and length-adjustable shaft means including a rod endwise insertable in said sockets in tab bores journaled relation and shaft length adjustment means blocking removal of said cover from said body after the seating of said shaft in said blind sockets, whereby body and cover interfittment in hinged relation is maintained in both normal covered, and inverted dumping condition of said receptacle.

25. Trash receptacle according to claim 24, in which said shaft length adjustment means comprises a compression spring responsive only to rod axial force, whereby said shaft means is permanently fixed upon rod seating in said blind sockets.

* * * * *

UNITED STATES PATENT AND TRADEMARK OFFICE
CERTIFICATE OF CORRECTION

PATENT NO. : 4,401,312

DATED : August 30, 1983

INVENTOR(S) : Bruce H. Parker

It is certified that error appears in the above-identified patent and that said Letters Patent is hereby corrected as shown below:

The sheet of drawing consisting of Fig. 12 should be added as shown on the attached sheet.

Signed and Sealed this

*Seventh* Day of *May 1985*

[SEAL]

*Attest:*

DONALD J. QUIGG

*Attesting Officer* *Acting Commissioner of Patents and Trademarks*

UNITED STATES PATENT AND TRADEMARK OFFICE
CERTIFICATE OF CORRECTION

PATENT NO. : 4,401,312

DATED : August 30, 1983

INVENTOR(S) : Bruce H. Parker

It is certified that error appears in the above-identified patent and that said Letters Patent is hereby corrected as shown below:

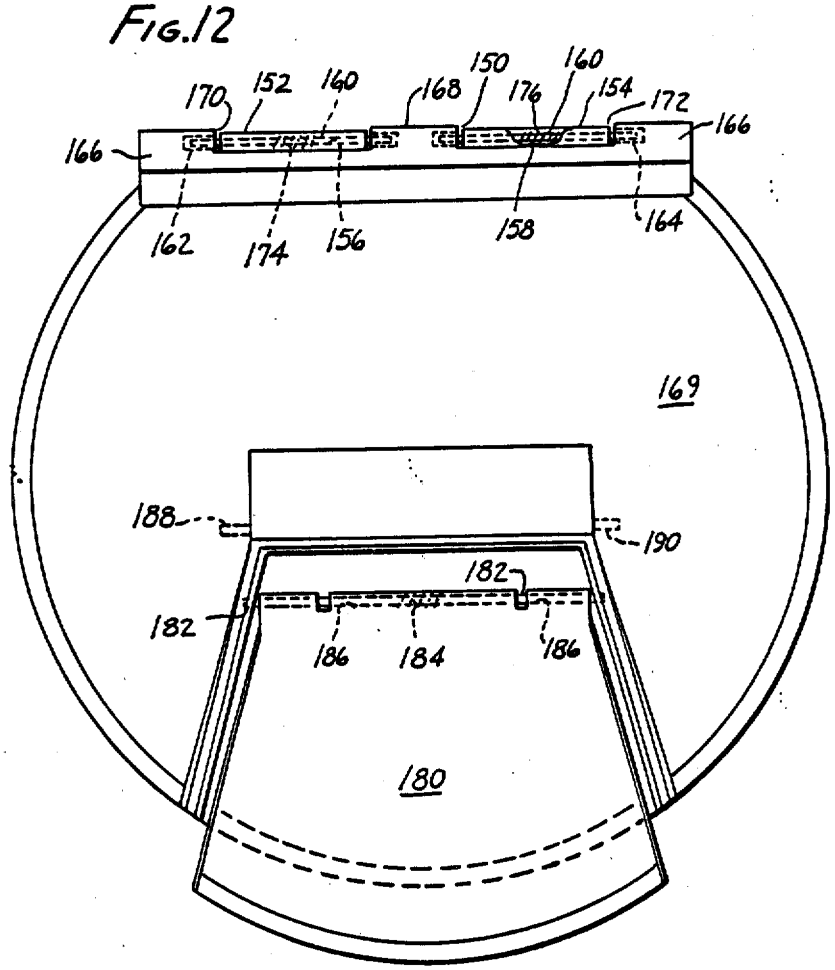

FIG. 12